US008000052B2

(12) United States Patent
Fry et al.

(10) Patent No.: US 8,000,052 B2
(45) Date of Patent: Aug. 16, 2011

(54) CARTRIDGE REFRESH AND VERIFY

(75) Inventors: Scott Milton Fry, Oro Valley, AZ (US); Reed Alan Hancock, Tucson, AZ (US); James Mitchell Karp, Tucson, AZ (US); Pamela Ruth Nylander-Hill, Tucson, AZ (US); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 12/189,623

(22) Filed: Aug. 11, 2008

(65) Prior Publication Data
US 2010/0033863 A1 Feb. 11, 2010

(51) Int. Cl.
*G11B 5/09* (2006.01)
(52) U.S. Cl. .............. 360/53; 360/31; 711/111
(58) Field of Classification Search .......... None
See application file for complete search history.

(56) References Cited

U.S. PATENT DOCUMENTS

| | | | |
|---|---|---|---|
| 6,023,388 A * | 2/2000 | Ikeda et al. | 360/72.1 |
| 6,182,121 B1 | 1/2001 | Wlaschin | 709/215 |
| 7,116,506 B1 * | 10/2006 | Mojica | 360/71 |
| 7,360,200 B2 | 4/2008 | Boucher | 717/100 |
| 7,552,359 B2 * | 6/2009 | Takemori | 714/11 |
| 2006/0053088 A1 | 3/2006 | Ali et al. | 707/1 |
| 2006/0100982 A1 | 5/2006 | Cohn | 707/1 |
| 2006/0101197 A1 * | 5/2006 | Georgis et al. | 711/111 |
| 2007/0050569 A1 * | 3/2007 | Haustein et al. | 711/154 |
| 2007/0115579 A1 * | 5/2007 | Ngo | 360/53 |
| 2007/0192384 A1 | 8/2007 | Shodhan et al. | 707/202 |
| 2009/0091853 A1 * | 4/2009 | Bai et al. | 360/31 |

FOREIGN PATENT DOCUMENTS

EP 574845 A2 * 12/1993

* cited by examiner

*Primary Examiner* — Jason C Olson
(74) *Attorney, Agent, or Firm* — Zilka-Kotab, PC

(57) ABSTRACT

A method according to one embodiment of the present invention includes receiving an instruction to perform a verification operation on a media cartridge having a tape wrapped around a spool; unwrapping at least some of the tape from the spool of the media cartridge; after the unwrapping, wrapping at least some of the tape back onto the spool; during at least one of the unwrapping and wrapping (and preferably both, and possibly over several cycles of unwrapping and wrapping), performing a verification operation; generating a quality metric based on the verification operation; and outputting the quality metric or derivative thereof, such as a pass or fail indication; an instruction to set a pass/fail flag; a number, score or graphic illustrating to a user a general quality of the tape, etc. Additional methods and systems are also presented.

17 Claims, 10 Drawing Sheets

CARTRIDGE REFRESH AND VERIFY

BACKGROUND

The present invention relates to tape-based data storage, and more particularly, this invention relates to refreshing and/or verifying media cartridges.

Data storage drives, such as data tape drives, record information to and read information from media, such as the data tape of a tape cartridge. Data storage drives are often used in conjunction with, for example, a data storage and retrieval system. One example of such a system is an automated data storage library with robotic picking devices, wherein removable media cartridges are selectively transported between storage cells and data storage drives in an automated environment. Herein, automated data storage library, data storage library, tape library system, data storage and retrieval system, and library may all be used interchangeably.

Once requested, data that is stored on data storage media of an automated data storage library typically is needed quickly. Thus, it is desirable that an automated data storage library be maintained in an operational condition on a continuous basis as much as possible. As a result, user expectations have moved toward a concept of continuous availability, such as the well known "24×7×365" availability.

One concern with maintaining tapes for prolonged periods is how to deal with expansion and contraction. Tapes expand and contract as a function of environmental factors such as humidity, temperature, etc. Over time, the expansion and contraction can be detrimental to the quality of the tape. However, there has heretofore been a lack of ways to avoid such damage.

A concern with reusing tapes for repeated data storage operations is that the condition of the tape or cartridge is not readily apparent. There has heretofore also been a lack of ways to estimate the condition of a cartridge or part thereof.

SUMMARY

A method according to one embodiment of the present invention includes receiving an instruction to perform a verification operation on a media cartridge having a tape wrapped around a spool; unwrapping at least some of the tape from the spool of the media cartridge; after the unwrapping, wrapping at least some of the tape back onto the spool; during at least one of the unwrapping and wrapping (and preferably both, and possibly over several cycles of unwrapping and wrapping), performing a verification operation; generating a quality metric based on the verification operation; and outputting the quality metric or derivative thereof, such as a pass or fail indication; an instruction to set a pass/fail flag; a number, score or graphic illustrating to a user a general quality of the tape, etc.

A method according to another embodiment of the present invention includes performing a verification operation on a media cartridge having a tape wrapped around a spool, the verification operation including at least one of a servo verify and a data verify; generating a quality metric based on the verification operation; and outputting the quality metric or derivative thereof to a user, the quality metric being indicative of a quality of the media cartridge, wherein the quality metric or derivative thereof is a value in a range having at least three values and preferably many values.

A method according to yet another embodiment of the present invention includes determining whether to perform a refresh operation on a media cartridge having a tape wrapped around a spool, the determination being based on some predefined criteria other than a presently-desired read or write operation of user data to or from a host; and performing the refresh operation by unwrapping the tape from the spool of the media cartridge to about an end of the tape, and after the unwrapping, wrapping the tape back onto the spool.

A method according to a further embodiment of the present invention includes deciding to perform a refresh operation on a media cartridge having a tape wrapped around a spool; determining which drive of a plurality of drives is available to perform the refresh operation; mounting the media cartridge to the available drive; causing the drive to unwrap the tape from the spool of the media cartridge to about an end of the tape; and after the unwrapping, causing the drive to wrap the tape back onto the spool.

Any of these embodiments may be implemented in a magnetic data storage system such as a data storage and retrieval system, which may include one or more drives.

Other aspects and embodiments of the present invention will become apparent from the following detailed description, which, when taken in conjunction with the drawings, illustrate by way of example the principles of the invention.

DETAILED DESCRIPTION

Figure 1:
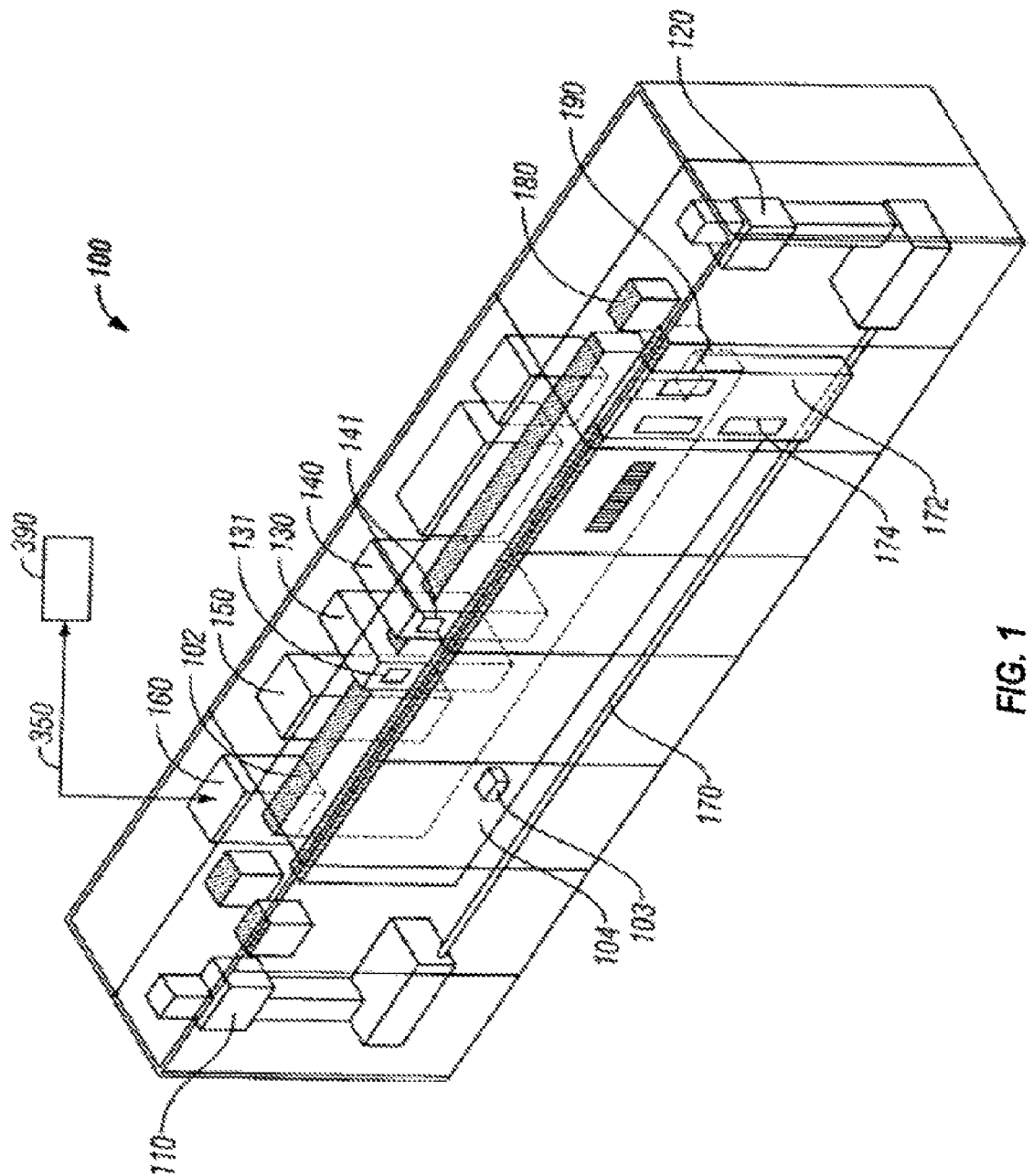
FIG. 1 is an isometric view of one embodiment of a data storage and retrieval system constructed in accordance with the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Described herein are several systems and methods for providing refresh and/or verification of media cartridges.

In one general embodiment, a method includes receiving an instruction to perform a verification operation on a media cartridge having a tape wrapped around a spool; unwrapping at least some of the tape from the spool of the media cartridge; after the unwrapping, wrapping at least some of the tape back onto the spool; during at least one of the unwrapping and wrapping (and preferably both, and possibly over several cycles of unwrapping and wrapping), performing a verification operation; generating a quality metric based on the verification operation; and outputting the quality metric or derivative thereof, such as a pass or fail indication; an instruction to set a pass/fail flag; a number, score or graphic illustrating to a user a general quality of the tape, etc.

In another general embodiment, a method includes performing a verification operation on a media cartridge having a tape wrapped around a spool, the verification operation including at least one of a servo verify and a data verify; generating a quality metric based on the verification operation; and outputting the qualify metric or derivative thereof to a user, the quality metric being indicative of a quality of the media cartridge, wherein the quality metric or derivative thereof is a value in a range having at least three values and preferably many values.

In yet another general embodiment, a method includes determining whether to perform a refresh operation on a media cartridge having a tape wrapped around a spool, the determination being based on some predefined criteria other than a presently-desired read or write operation of user data to or from a host; and performing the refresh operation by unwrapping the tape from the spool of the media cartridge to about an end of the tape, and after the unwrapping, wrapping the tape back onto the spool.

In a further general embodiment, a method includes deciding to perform a refresh operation on a media cartridge having a tape wrapped around a spool; determining which drive of a plurality of drives is available to perform the refresh operation; mounting the media cartridge to the available drive; causing the drive to unwrap the tape from the spool of the media cartridge to about an end of the tape; and after the unwrapping, causing the drive to wrap the tape back onto the spool.

Figure 3:
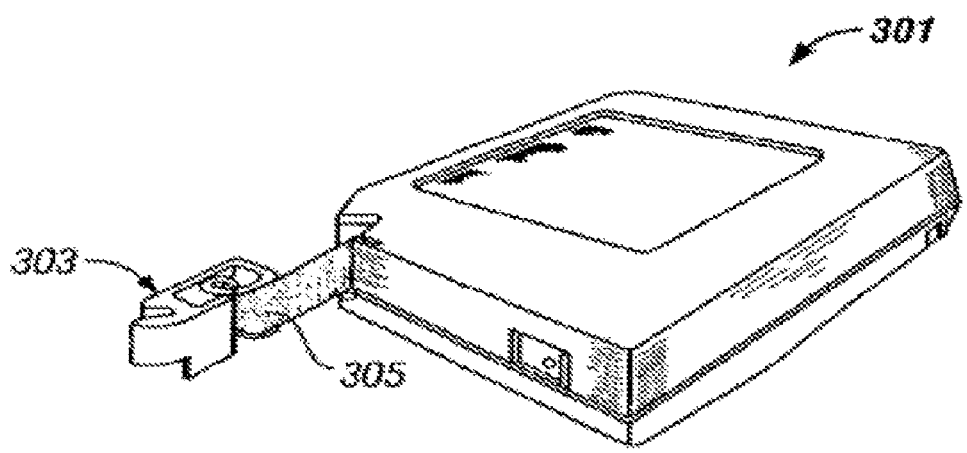
FIG. 3 is an isometric view of a removable tape cartridge used in conjunction with the tape drive of FIG. 2.

Referring to FIG. 1, a data storage and retrieval system 100 is shown. In the embodiment illustrated, data storage and retrieval system 100 is depicted as a robotic library. The upper interface of controller 160 allows data storage and retrieval system 100 to communicate with one or more hosts 390 via link 350. Link 350 may comprise an Ethernet, Infiniband, TCP/IP, Fibre Channel-Arbitrated Loop, SCSI, ESCON, FICON, or the like, depending on the application. The lower interface of controller 160 communicates with a plurality of drives that are positioned in drive enclosures 130 and 140. Drive enclosures 130 and 140 receive removable media cartridges 103 (e.g., see cartridges in FIGS. 3, 6, and 7), via robotic pickers 110 and 120. The removable media cartridges 103 may include or contain magnetic tape, optical tape, optical disk media, magneto-optical disk, CD, DVD, phase-change media, floppy disk, removable hard disk, electronic media, and the like. Robotic pickers 110 and 120 travel along rail 170 to move removable media cartridges 103 from inner storage wall 102 and outer storage wall 104 to drive enclosures 130 and 140 for the purposes of reading and/or writing data. Robotic pickers 110 and 120 also return the removable media cartridges 103 to storage walls 102 and 104.

An import/export station 172 includes access door 174 attached to the side of data storage and retrieval system 100. Access door 174 is preferably pivotally attached to the side of data storage and retrieval system 100; however, access door 174 could be slidably or otherwise attached. An operator panel or access station 150 permits a user to communicate directly with data storage and retrieval system 100. The operator access station 150 typically contains an LCD display, a keyboard or touch screen, for user input, and circuits to monitor and control the I/O station doors.

First power component 180 and second power component 190 each comprise one or more power supplies that supply power to pickers 110 and 120, controller 160, operator access station 150, and drive enclosures 130 and 140 of data storage and retrieval system 100. Typically, at least one of the power components 180 and 190 provides direct current (DC) power, since most computer peripheral devices use DC power. One of the power components 180 and 190 may provide alternating current (AC) as well. Controller 160 is in communication with power components 180 and 190, pickers 110 and 120, operator access station 150, drive enclosures 130 and 140, and data storage drives (see FIGS. 2, 10, 11) of data storage and retrieval system 100.

Figure 2:
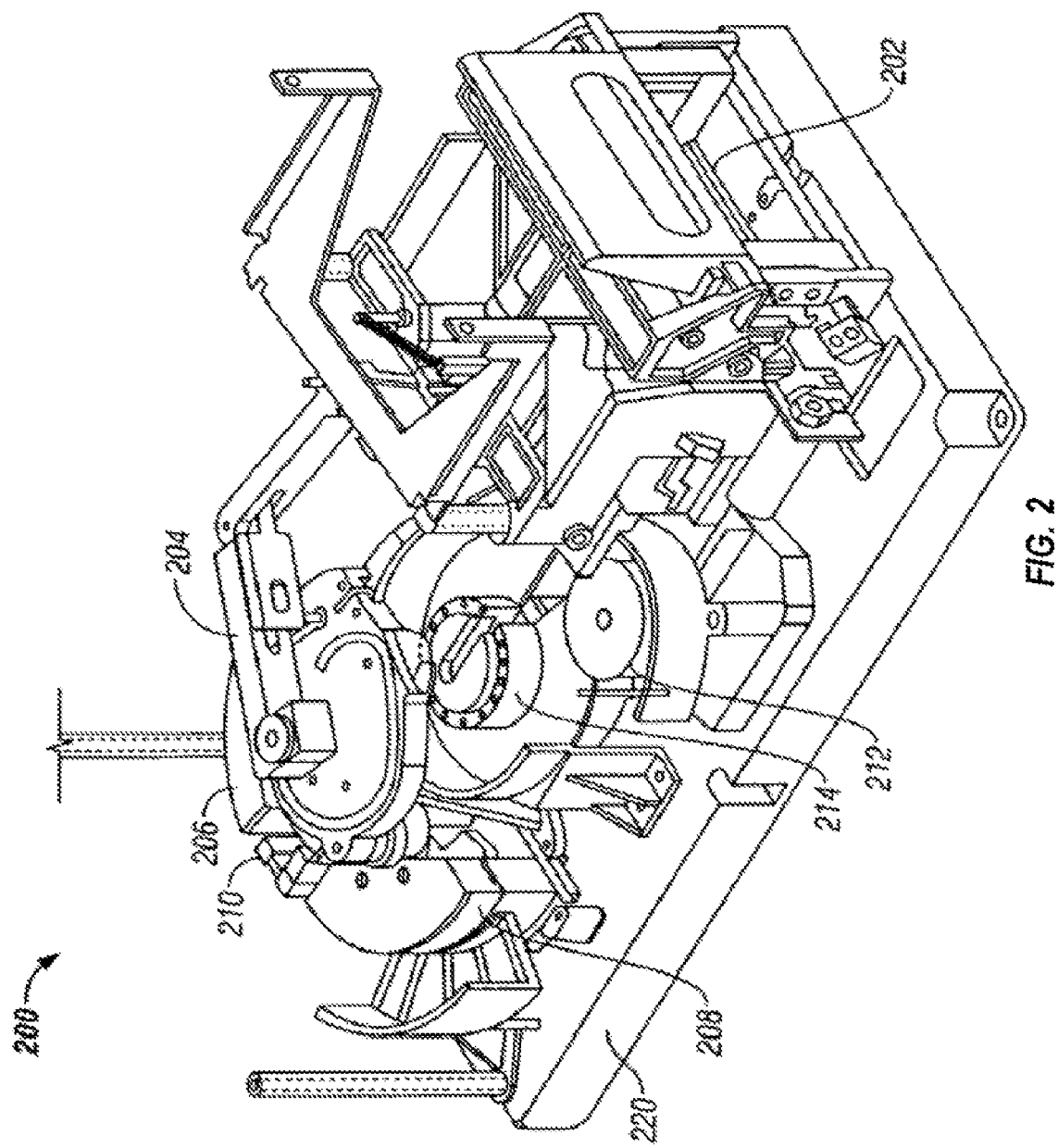
FIG. 2 is an isometric view of a tape drive utilized by the data storage and retrieval system of FIG. 1.

Referring now to FIG. 2, a typical reel-to-reel tape drive 200 is shown. As described above, any removable media data storage drive may be used, such as tape drives, optical and magnetic disk drives, electronic media drives, or any other drives and media as is known to those skilled in the art. A plurality of drives 200 are usually located inside of the library 100 of FIG. 1. Tape drive 200 may be any one of, for example, a family of tape drives using a single-reel tape cartridge, such as the IBM 3480, IBM 3490, IBM 3590, IBM 3592, Digital Linear Tape (DLT), and Linear Tape Open (LTO) tape drives. Cartridge loader 202 receives a single-reel tape cartridge 301 (see FIG. 3) and threader 204 threads the leader-block 303 of the tape 305 around the tape guides 206 and 208, and around the tape tension transducer 212, and into the take-up reel 214. Tape guides 206 and 208 support the tape as the tape moves over the magnetic tape head 210. All of these components are supported by base plate 220. One or more tape drives 200 are located inside drive enclosures 130, 140 (FIG. 1) in order to protect the tape drives 200 from dust and debris, as well as extraneous air currents that could disturb the way the magnetic tape 305 passes over the magnetic bead 210.

Figure 4:
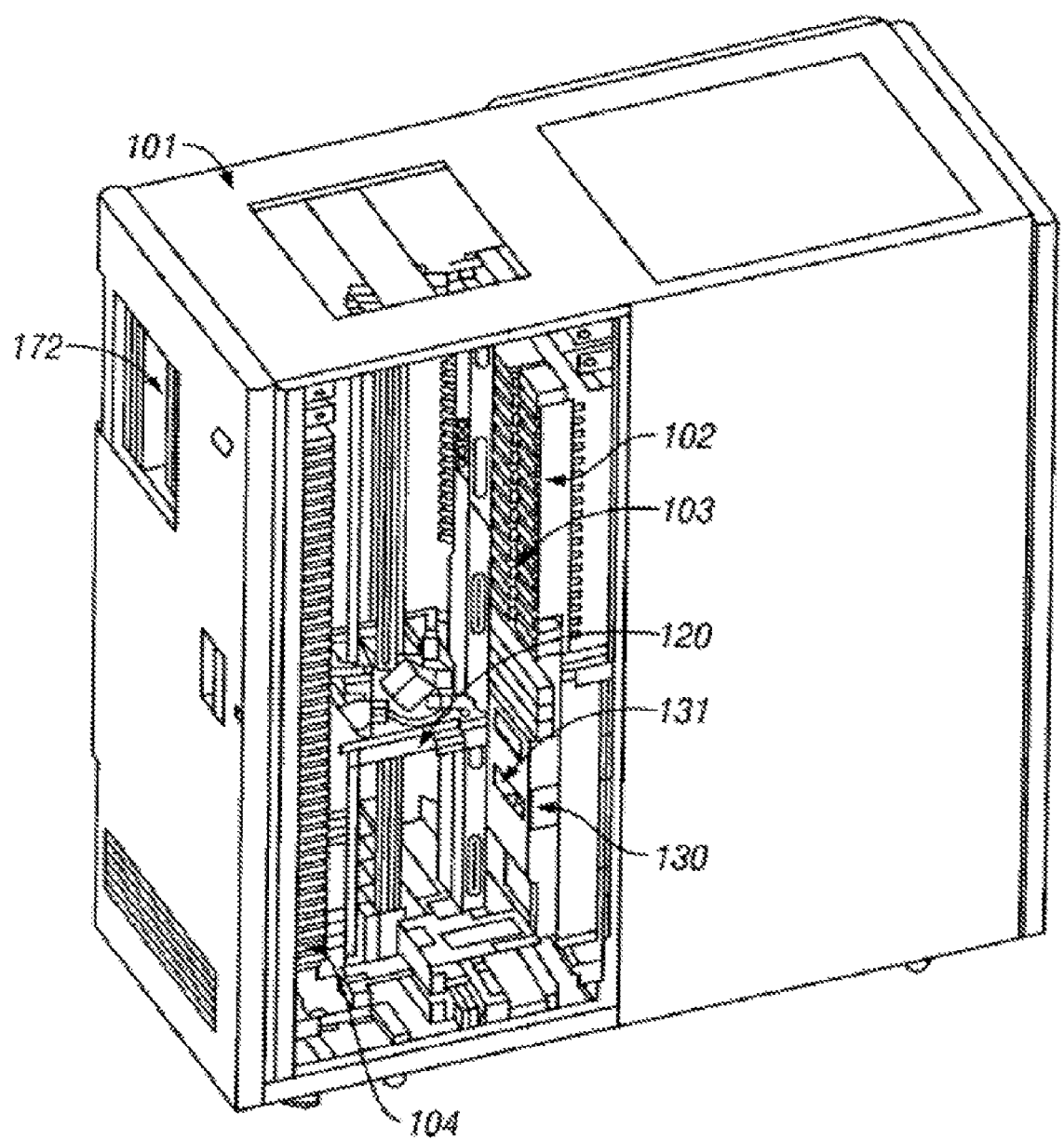
FIG. 4 is an isometric view of a storage module utilized by the data storage and retrieval system of FIG. 1.

The data storage and retrieval system 100 of FIG. 1 is typically assembled from a series of frames or storage modules 101, such as the L-frame type storage module illustrated in FIG. 4. A storage module is an expansion component of the library. Frames, accessors, magazines, etc. may comprise examples of storage modules. The storage module may comprise one or more of the following: one or more storage shelves for holding data storage media, one or more data storage drives for reading and/or writing data on the data storage media, one or more import/export stations for operator access to the data storage media, one or more accessors for moving the data storage media to/from data storage drives and storage shelves, one or more frames or compartments for holding additional storage modules or library components. In the example of FIG. 1, the desired number of storage modules 101 are assembled into data storage and retrieval system 100. Storage module 101 comprises a picker 120, a drive enclosure 130, an inner storage wall 102, and an outer storage wall 104.

A plurality of removable storage media 103 are located in each storage wall 102, 104. In this example, removable storage media 103 comprises tape cartridges, but may also comprise other types of media such as those described above.

Figure 8:
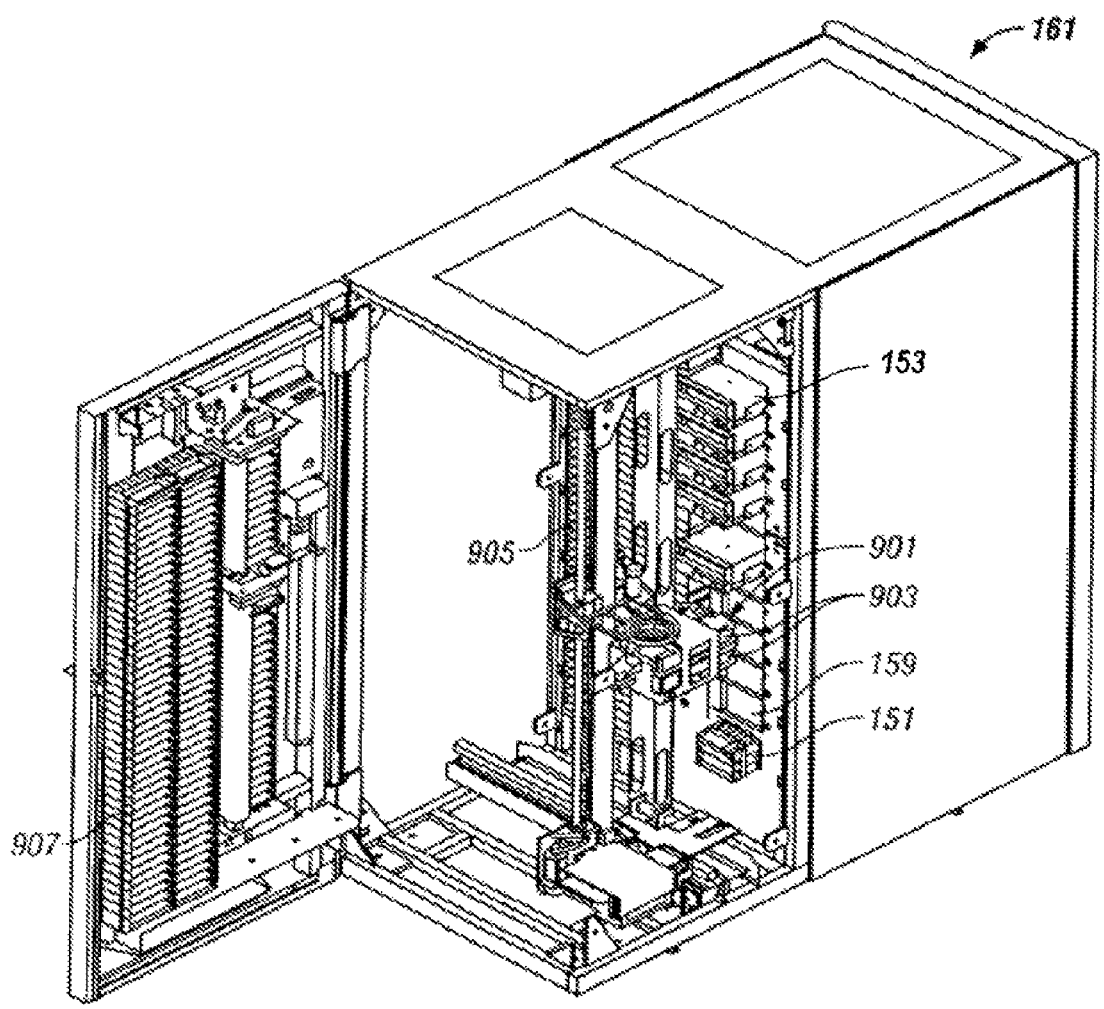
FIG. 8 is an isometric view of an alternate configuration of the storage module of FIG. 4 with a front door open and a rear door closed.
Figure 9:
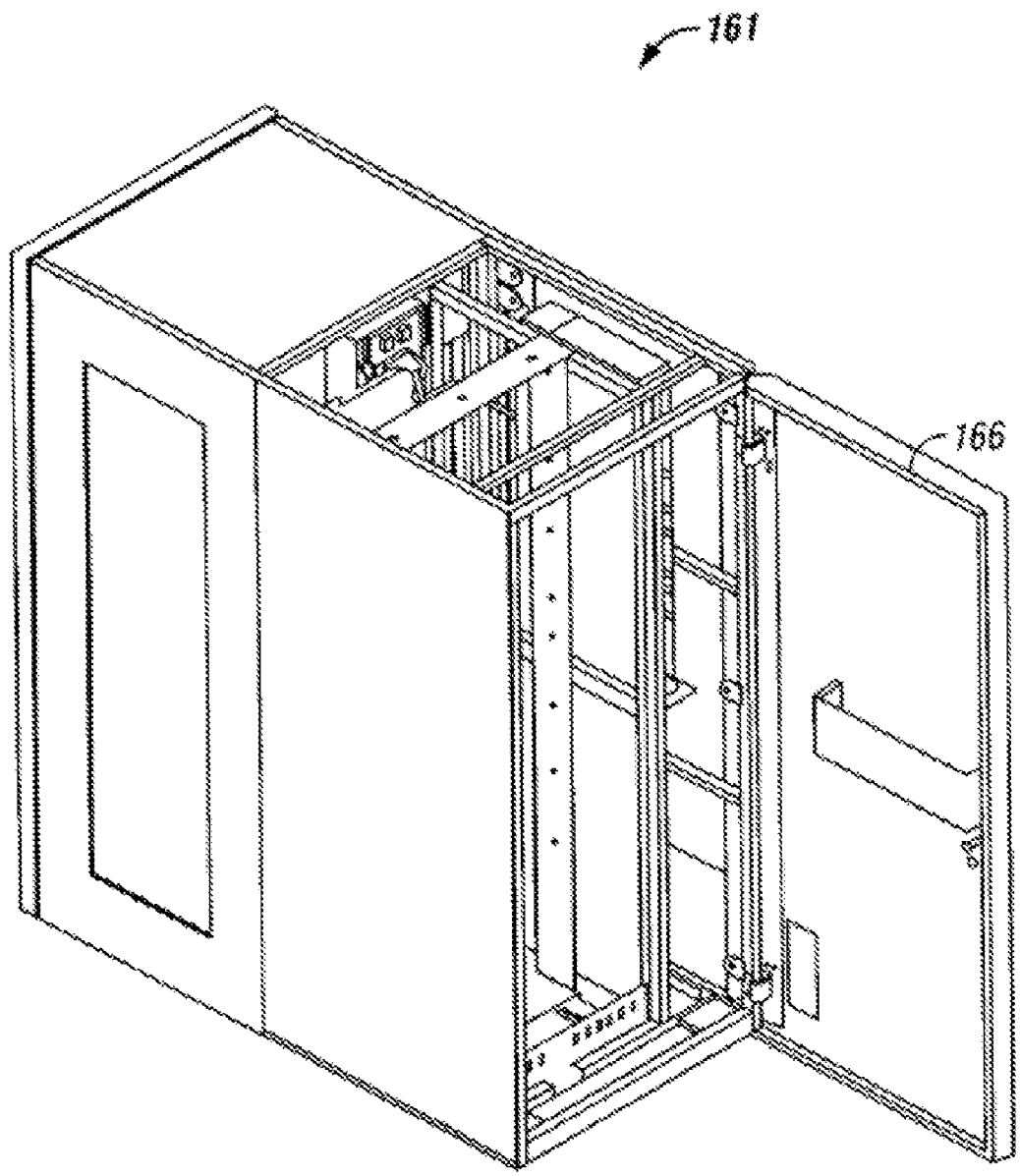
FIG. 9 is a reverse isometric view of the storage module of FIG. 8 with the front door closed and the rear door open.
Figure 10:
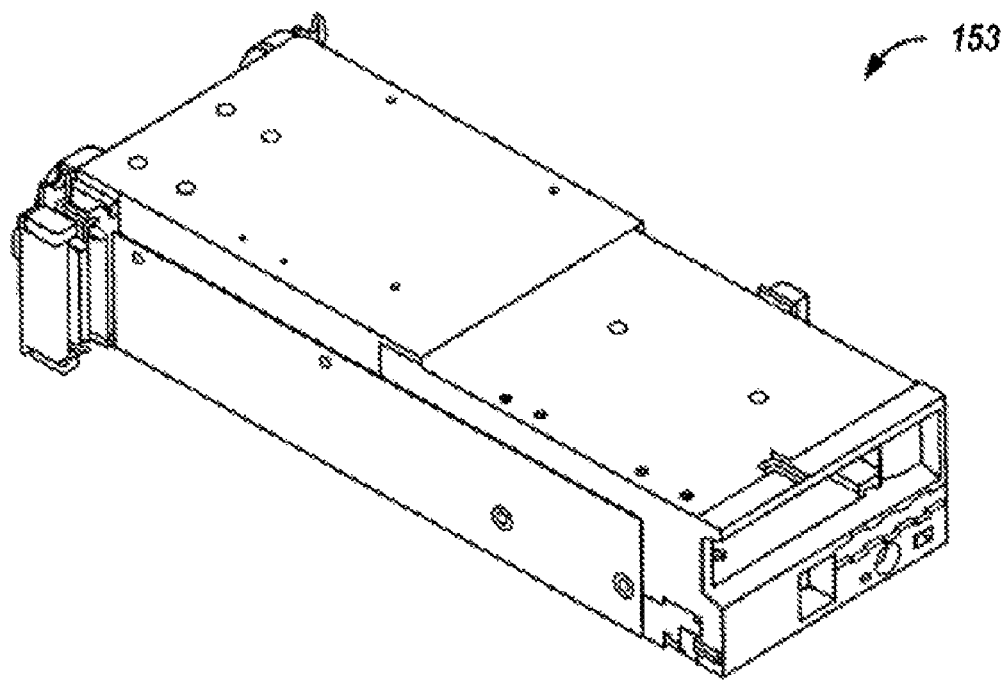
FIG. 10 is a front isometric view of a drive canister.
Figure 11:
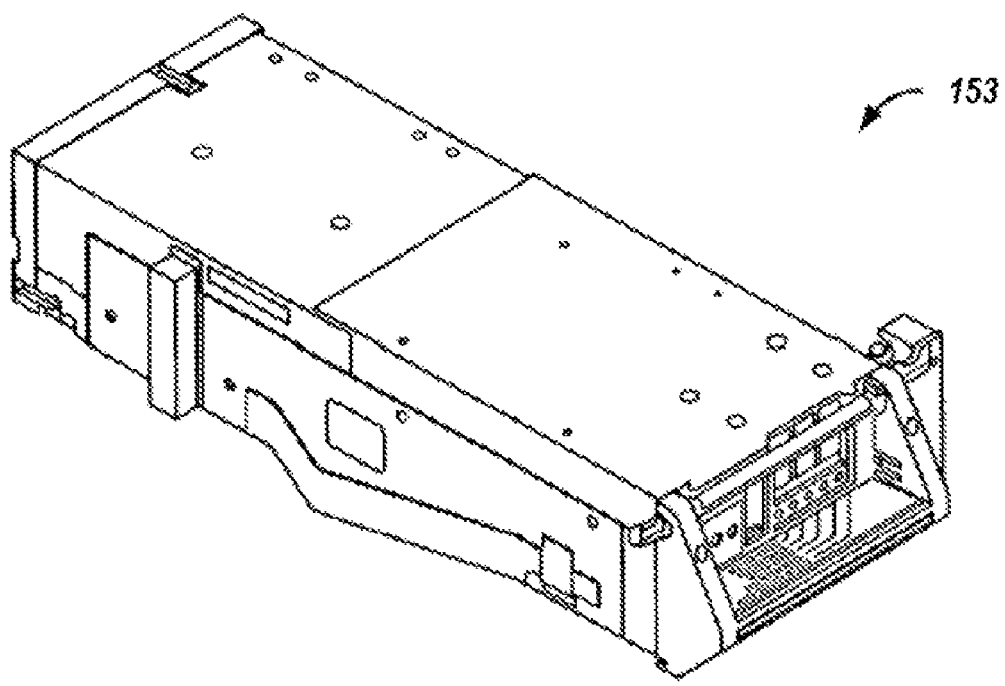
FIG. 11 is a rear isometric view of the drive canister of FIG. 10.

Removable storage media 103 are inserted via robotic pickers 110, 120 into drive enclosures 130, 140 via entrances 131, 141 (FIG. 1), respectively, where removable storage media 103 are mounted inside the data storage drive, such as tape drive 200 (FIG. 2) or data storage drive 153 (FIGS. 8, 10 and 11). Each picker 110, 120 includes a gripper assembly having a bar code scanner for reading cartridge labels, or other means for identifying the cartridges. As best shown in FIG. 8, a gripper assembly 901 may contain, for example, a plurality of grippers 903. The grippers 903 are mounted in a cage that can pivot from one side of the library to the other. This allows access to both storage walls 905, 907 by either gripper.

Figure 6:
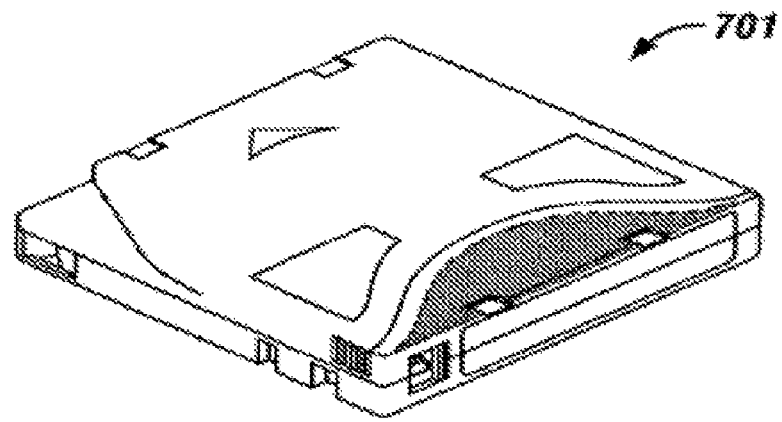
FIG. 6 is an isometric view of an alternate removable tape cartridge usable in conjunction with a tape drive.
Figure 7:
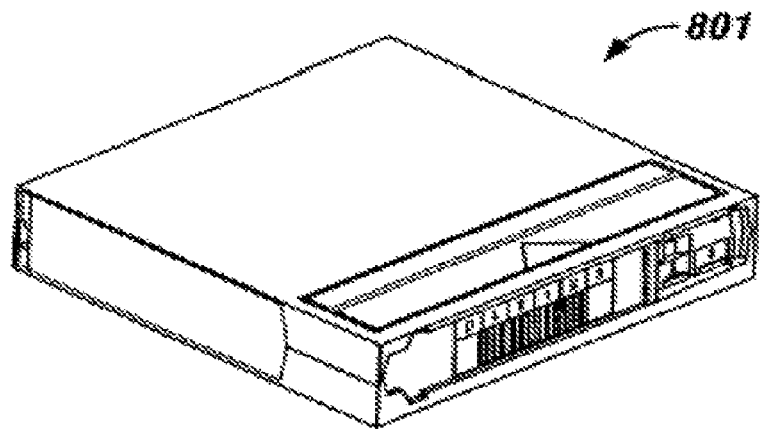
FIG. 7 is an isometric view of another alternate removable tape cartridge usable in conjunction with a tape drive.
Figure 5:
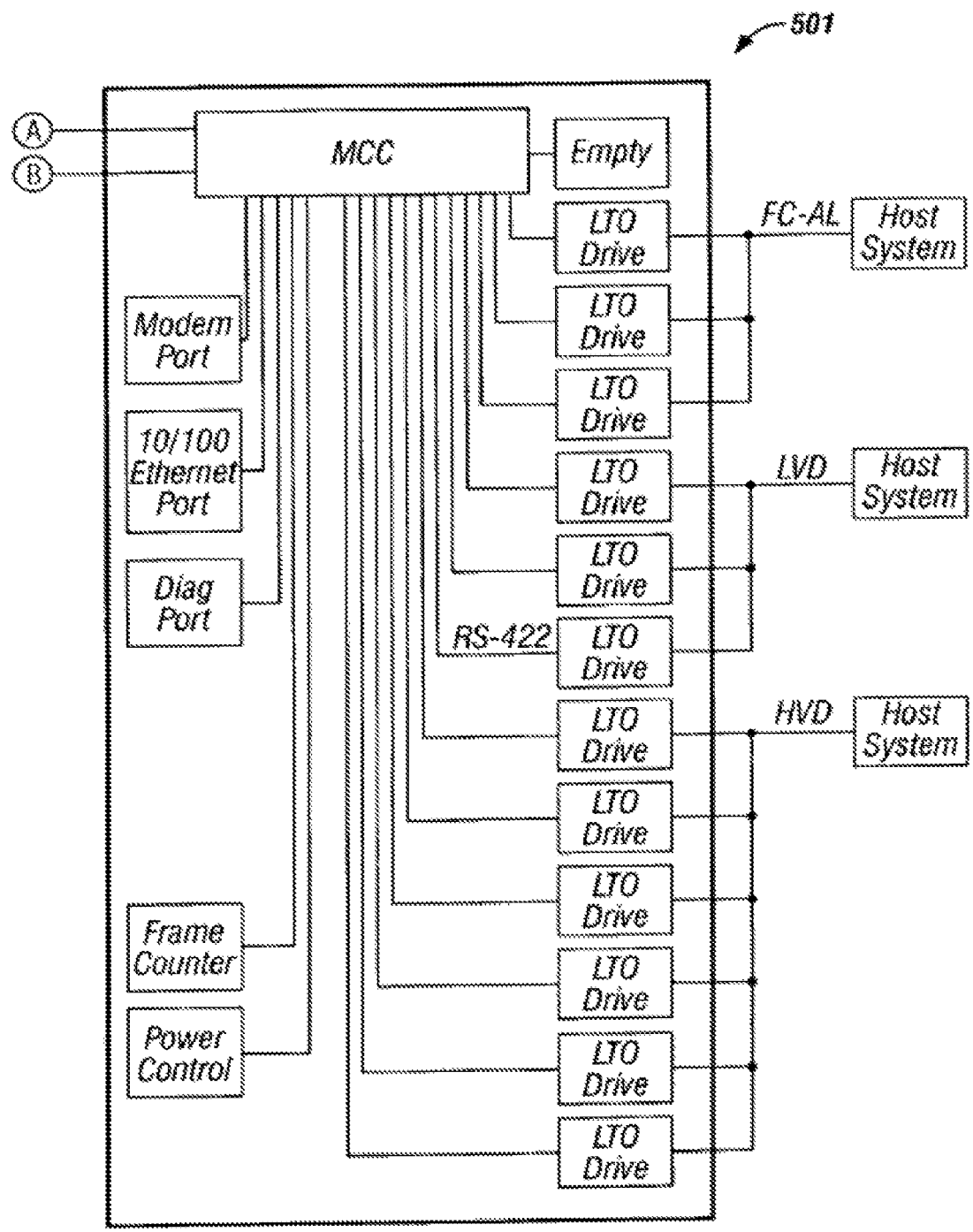
FIG. 5 is a schematic diagram of an alternate storage module utilized by the data storage and retrieval system of FIG. 1.

Referring now to FIG. 5, a schematic diagram of an optional frame or storage module known as a Linear Tape Open (LTO) D-frame 501 is shown. LTO D-frame 501 provides additional storage and may provide additional drives as well. The description is similar to that for storage module 101, except that there may be zero to twelve tape drives for LTO tape cartridges 701 (FIG. 6). FIG. 7 shows another alternate removable tape cartridge 801 usable in conjunction with a tape drive. If no drives are installed, then no MCC and supporting circuits/ports will be installed.

To increase the storage capacity of data storage and retrieval system 100, one or more cartridge storage devices 151 (FIG. 8) may be present to store media cartridges. As used herein, a cartridge storage device is a device capable of holding several media cartridges (defined above) for transportation, storage, and/or use in conjunction with a data storage and retrieval system 100. The cartridge storage device may be capable of storing a number of media cartridges, optionally with each cartridge stored on a transport mechanism that feeds the cartridge to the front of the cartridge storage device for access by the library picker 110, 120.

It must also be noted that the teachings herein can be applied to a standalone storage system, such as a tape drive connected to a host system, e.g., via a SCSI or USB interface. Such storage system may function in a conventional manner and provide further functionality according to the teachings presented herein.

As noted above, it would be desirable to enable refreshing of media cartridges and/or verification of the quality of the cartridge and the data residing on the cartridge to varying degrees. Internal product testing has revealed the importance of a physical refresh of the media for maintaining long term archive quality, where a refresh is defined as an unwinding of the tape from the spool of a media cartridge to about an end of the tape and then wrapping the tape back up around the spool, where about the end of the tape is some point within about the last 10% of the tape length able to be unwrapped from the spool, more preferably to some point within about the last 3% of the tape length, even more preferably to about an end of tape position marker, etc. In particularly preferred approaches, the feature is automatically performed with simple policy setup, and may provide varying degrees of tape quality and/or data quality checking at the same time.

Figure 12:
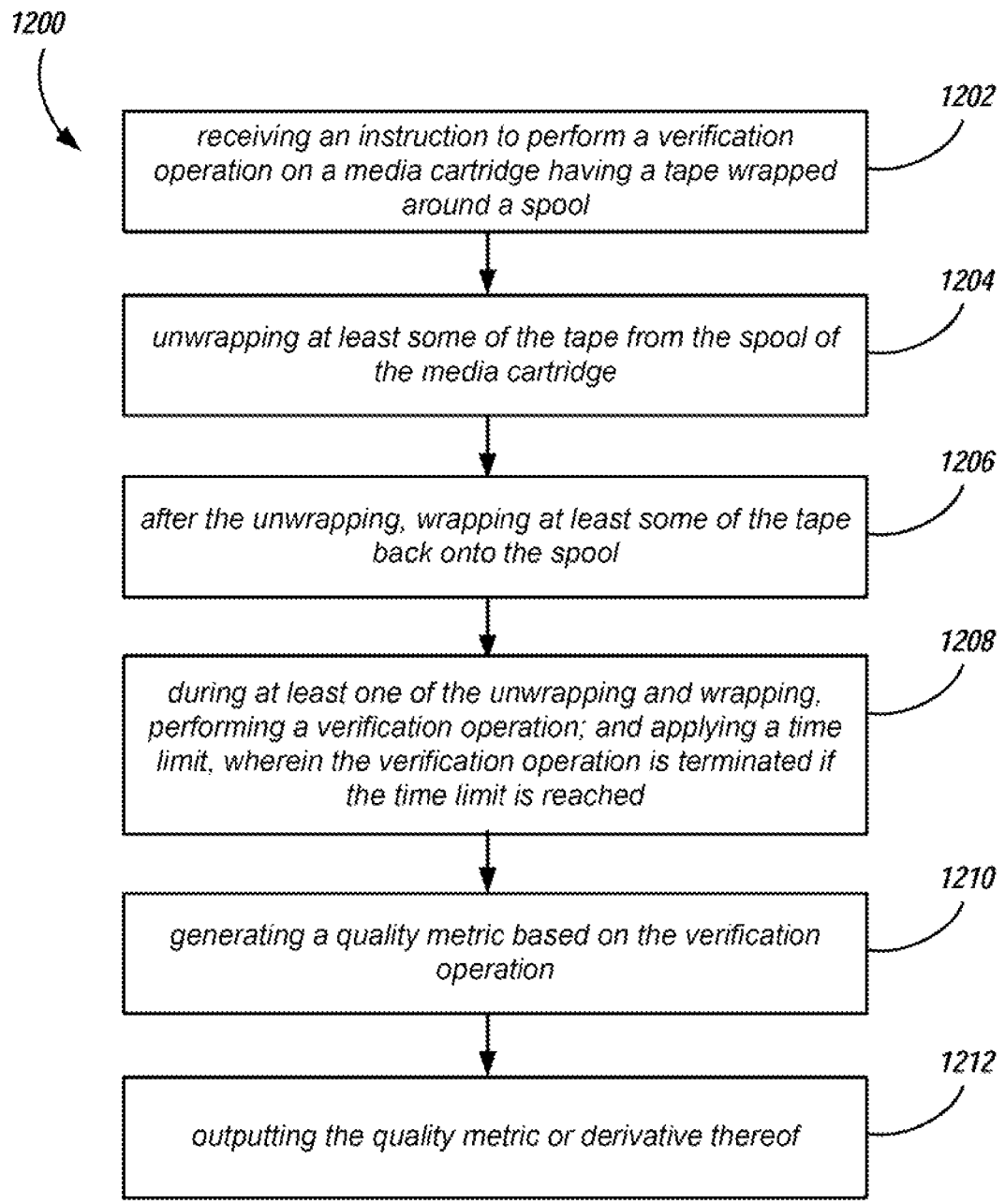
FIG. 12 is a process diagram depicting a method according to one embodiment.

With reference to FIG. 12, a method 1200 for coordinating reader transmissions is shown according to one embodiment. As an option, the present method 1200 may be implemented in the context of the functionality and architecture of FIGS. 1-11. Of course, the method 1200 may be carried out in any desired environment. It should also be noted that the aforementioned definitions may apply during the present description.

With reference to FIG. 12, in operation 1202, an instruction to perform a verification operation on a media cartridge having a tape wrapped around a spool is received. The instruction may include a command, examples of which are described in more detail below.

The instruction may come from any source. For example, the instruction may come from the drive itself, e.g., a drive induced command via an IBM Statistical Analysis and Reporting System (SARS) results. In another approach, the instruction may come from a host, such as a SEND DIAGNOSTICS command sent via the host bus. In yet another approach, the instruction may come from a library controller, such as a library command via the library interface. In further approaches, drives may support this feature as a SCSI send diagnostic command and/or as a Library Interface command. Note that the parameter set may be similar but the behaviors may be slightly different for the two command paths (SCSI vs. Library).

Various parameters that may be used in the instruction command are presented in more detail below.

In operation 1204, at least some of the tape is unwrapped from the spool of the media cartridge. Again, some or all of the tape may be unwrapped. After the unwrapping, at least some of the tape is wrapped back onto the spool. Note operation 1206. If a simple refresh is all that is desired, the process may stop here. Accordingly, a simple refresh may include only one unwrapping and wrapping. Other approaches may include multiple cycles of unwrapping and wrapping.

If verification is desired, then the process continues. In operation 1208, preferably during at least one of the unwrapping and wrapping (and preferably during both, and possibly over several cycles of unwrapping and wrapping), a verification operation is performed. More information about various types of verification operations is presented below.

In operation 1210, a quality metric is generated based on the verification operation. The quality metric, as discussed in more detail below, may represent a quality of: the cartridge overall, the tape media therein, and/or the customer and/or servo data written thereto.

The quality metric, or derivative thereof, is output in operation 1212. Illustrative quality metrics, or derivatives thereof, include a pass or fail indication; an instruction to set a pass/fail flag; a number, score or graphic illustrating to a user a general quality of the tape, etc.

Drive Command Parameters

For various command paths, the following common parameters may be issued or returned. Note that these parameters are presented by way of example, and some, all, additional and/or other parameters of the same or other type may be used in a particular implementation.

Refresh and/or Verify Eligibility

As an option, the drive may be polled, e.g., in Mode Sense or via the library interface, to determine if the drive is eligible to perform (or at least assist in) a refresh and/or verification operation. In one illustrative embodiment, a drive is eligible to perform a refresh if some predefined criteria are met. Illustrative criteria include whether a clean for performance flag is set. If the flag is not set, the drive is eligible.

Another illustrative eligibility criterion is that no tape alerts or Single-Stream Interacting Machines (SIM) messages and/or Multiple-stream Interacting Machines (MIM) messages are currently active, and none were generated in a preceding number of mounts, e.g., in the last 10 mounts. Yet another illustrative eligibility criterion is that no perm of any kind (where a perm denotes a failed recovery attempt), including load/unload fails, Read/Write (R/W) and servo perms, occurred in a preceding number of mounts, e.g., in the last 10 mount queue history. A further illustrative eligibility criterion is that no Format Identification (FID) and/or /Fault Symptom Code (FSC) is outstanding or was posted in a preceding number of mounts, e.g., in the last 10 mounts.

A drive may remain ineligible until repair or reset if a number of previously-attempted refresh operations failed, e.g., the last 3 refresh operations in a row failed for any reason.

If the command is received and the drive is not eligible to perform the operation, a check condition may be generated.

Refresh Type

As alluded to above, various refresh options may be made available. A parameter field in the command may select the refresh type. Three refresh options are described below, two of which include verification operations. Note that these are presented for illustrative purposes only and should not be construed as limiting. Moreover, verification can be performed without performing a refresh, though generally the greatest benefit is received by performing a verify operation with a refresh.

In a first approach, a media refresh only is performed. In a particularly preferred embodiment, this option locates the end-of-tape marker and then rewinds the tape back onto the spool. Preferably, no other checking is performed.

In a second approach, media refresh with servo verify is performed. One embodiment unwinds the tape to about the end of the tape, e.g., to the end-of-tape marker, and then rewinds the tape back onto the spool while performing a servo verify in both directions. Tapes tend to deteriorate from the outer edges inwardly, so the outer servo tracks are preferably used during the servo verify operation, though other servo tracks could be used. In one embodiment, the drive performs a servo locate with write criteria checking to about the end of tape on the servo track closest to the top edge, then rewinds with a similar operation on the servo track nearest the bottom edge of the tape. During this process, error events, such as Stopwrite (SW), Position Error Signal (PES), Servo Pattern Error (SPE), and/or invalid Linear Position (LPOS) events, may be counted or noted, and used or considered in the generation of the quality metric. Moreover, each of the events may be given a weighting, which may be applied to the count value during calculation of the quality metric. For example, the weighted values may be summed to provide a 1 or 2 byte value which is the quality metric or used in further calculation of the quality metric.

In a third approach, media refresh with data verify is performed. In one embodiment, all data on the tape is read, preferably in logical wrap order. In another embodiment, only selected data is read, e.g., every second or third set of tracks, etc. In yet another embodiment, at least some data on the tape is overwritten with new data, and the verification operation is performed using the new data. This latter case is most useful when the data already on the tape is no longer needed and the general condition of the tape is desired to be determined.

The drive may use Command Memory (CM) information, Housekeeping Data (HKD), etc. as it normally would to read a tape. Preferably, Error Recovery Procedure (ERP) actions are enabled. In particularly preferred embodiments, ERP actions are time-limited to simple ERPs, and a time limit per ERP may be imposed, e.g., 10 seconds.

Read perms, temps, and/or other error counters may be monitored and the corresponding counts or values may be used or considered in calculating the quality metric.

Where multiple unwind/wind cycles are performed, a simple refresh operation is preferably performed on the cartridge as a last step so as to avoid interrupting the refresh.

Time Limit

A time limit may be imposed if desired. For example, it may be undesirable to keep a drive occupied with verification operations beyond a certain time limit. Accordingly, a time limit may be added to the command or otherwise applied. In particularly preferred approaches, the time limit field is only valid if refresh with data verify mode is selected, as most issues with excessive duration will arise during data verify mode. For example, ERPs may significantly increase the time to perform the verification process. If the time expires before completion of the verification process, the verification operation is terminated. For example, the drive may interrupt the operation at the next wrap boundary, record the checkpoint and checkpoint status, and complete the command and/or remaining steps in the process.

Media Quality and Media Pass/Fail

As noted above, a quality metric, or derivative thereof, is output e.g., to a user; to another process; to memory or storage for later use; stored on the media cartridge itself, e.g., in a memory thereof on the tape medium itself, etc.; etc. Illustrative quality metrics, or derivatives thereof, include a pass or fail indication; an instruction to set a pass/fail flag; a number, score or graphic illustrating to a user a general quality of the tape, etc. The quality metric may represent a quality of: the cartridge overall, the tape media therein, the customer and/or servo data written thereto, etc.

Figure 13:
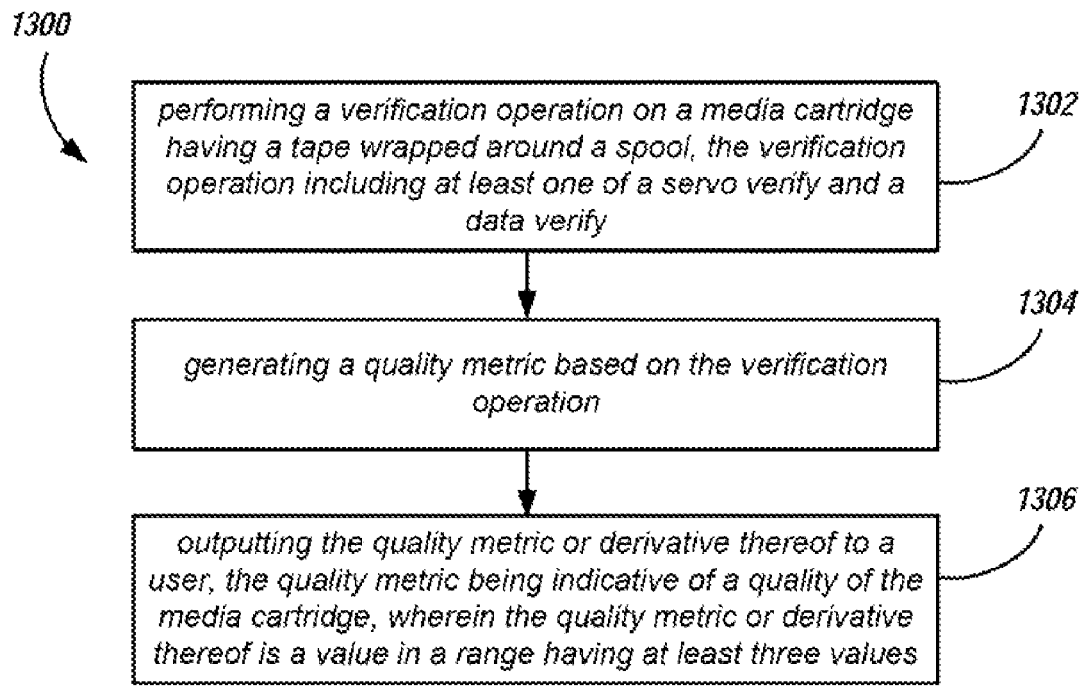
FIG. 13 is a process diagram depicting a method according to one embodiment.

In one approach, illustrated generally in FIG. 13, operation 1302 of a method 1300 according to one embodiment includes performing a verification operation on a media cartridge having a tape wrapped around a spool, the verification operation including at least one of a servo verify and a data verify. In operation 1304, a quality metric is generated based on the verification operation. In operation 1306, the quality metric or derivative thereof is output to a user, the quality metric being indicative of a quality of the media cartridge. For example, the quality metric may provide some indication of the quality of the media cartridge (or component part thereof) in terms of, e.g., its suitability for use for further recording, an integrity of the servo tracks on the tape, an integrity of the customer data on the tape (without requiring a full compare of the data to the source files), etc. Preferably, the quality metric or derivative thereof is a value in a range having at least three values and preferably many values.

In one illustrative embodiment, a Media Quality return parameter is a quality metric with a returned value from x'00' to x'FF', where x'00' is the best quality and x'FF' is the poorest quality. Preferably, for the Media Refresh operation only, this field always returns x'00'.

The system may also return a Pass/Fail indication. In one approach, a fail flag is set if the media quality exceeds the fail quality threshold. For example, a default for this threshold is d'200'. Preferably, for full read verify, a read perm or many read temps may generate a fail status. Preferably, for two wrap servo verify, SW and SPE may exceed some threshold to fail, e.g., 10× the manufacturing specification.

The fail flag may also be set if a time limit was exceeded. This may correspond to an excessive amount of ERP actions, indicating a poor state of the cartridge.

Step Complete and Sequence Complete

The Step Complete return code indicates that the operation in progress was successful.

The Sequence Complete return code indicates that the last step associated with a refresh is complete and the entire operation is completed. When this bit is set, the Media quality and Pass/Fail values are valid.

Drive Command Execution

In one illustrative embodiment, the drive command execution proceeds as follows. The drive is polled for eligibility by the host/library before command invocation. From the host invocation, a cartridge may be mounted and in the ready state. The Send Diagnostic command is received, and if the drive is eligible, and the parameter fields associated with the command are valid, the command execution is started. During the command, the drive reports busy status for all other host commands except Send Diagnostic abort sequence.

At the end of the command after status is reported, the cartridge is returned to load point/ready status. During the operation, the cartridge is treated as a write protected cartridge and no fields or data are altered with the exception of the CM fields associated with the verify operation. The processing of a refresh operation does not effect or cause event logging in hardware or media SARS queues, although all ccSARS counters are maintained for the duration of the mount.

To support interruptible full verify commands, the drive may support a Command Abort sequence which may be issued to stop a refresh command already in progress. During a command abort sequence, the drive stops the current operation on the next wrap boundary and return status. The progress wrap, partial media quality, and validity indicator may be stored, e.g., in new fields in the CM, to allow re-start from the aborted position.

The timeout of the timer value may be treated as an abort. The host or library program preferably remembers all steps that are not completed on the cartridge (e.g., by checking the sequence complete bit) and is able to reload at a future time for command completion by re-invocation of the command.

Library Control Scenario

An illustrative, basic operational summary of a successful sequence from the library follows. Again, the following is presented by way of example only.

Figure 14:
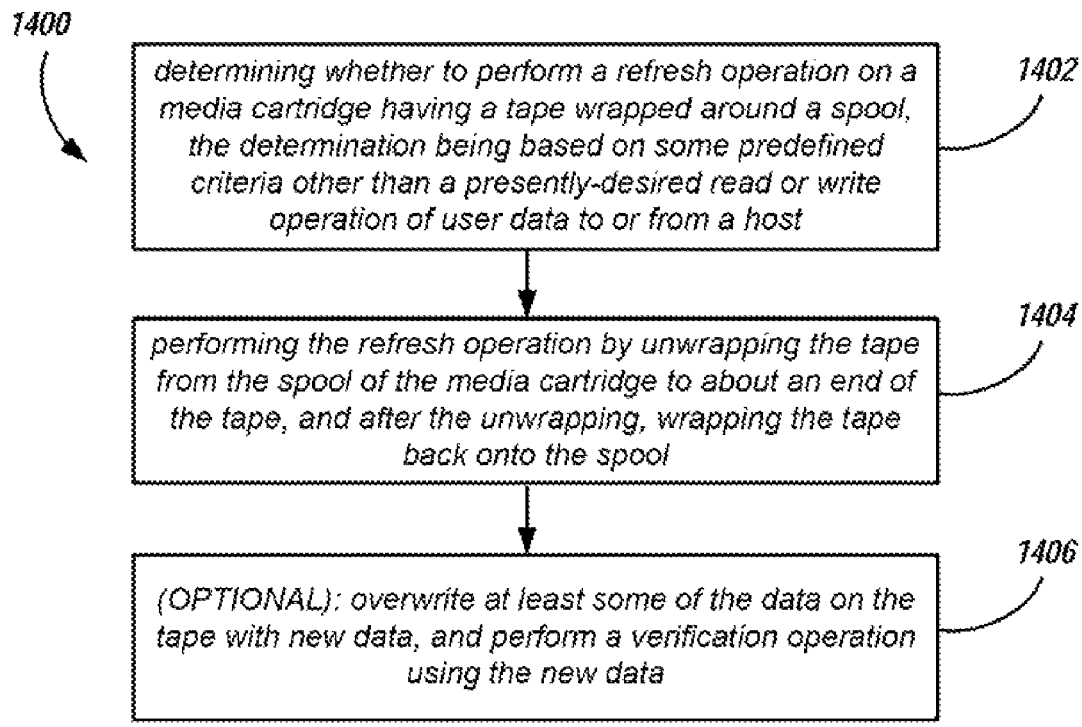
FIG. 14 is a process diagram depicting a method according to one embodiment.

With reference to the method 1400 of FIG. 14, a determination is made as to whether to perform a refresh operation on a media cartridge having a tape wrapped around a spool, the determination being based on some predefined criteria other than a presently-desired read or write operation of user data to or from a host. Note operation 1402. In operation 1404, the refresh operation is performed. In optional operation 1406, at least some of the data on the tape is overwritten with new data, and a verification operation is performed using the new data.

The library or other storage system maintains several data fields, which may include some or all of the following:

- A "Day Last Processed" field for all physical volumes in inventory. This indicates the day the last host mount or library refresh was performed on a physical volume. Resolution to the day is envisioned to be adequate, though could be higher or lower.
- A "Media Verification Quality" value.
- A "refresh policy period" system global value.
- A "refresh required" flag for each physical volume.
- An "exclude from refresh" flag for each physical volume.
- An "available for refresh" flag for each drive.
- A mechanism to generate alerts to users.

The user may establish a "refresh" period policy in the library software. Typically this period would be programmable from 1 to 5 years in duration, but could be longer or shorter. Accordingly, the determination about whether to perform a refresh operation and/or verification may be made automatically based at least in part on a date of last use of the media cartridge. The last use can include a last read or write operation, a last refresh of the cartridge, a last verification operation, etc.

When a cartridge has not been mounted in the policy period, a flag may be set in library physical volume meta-data indicating a refresh operation is desired or required on a given volume. This preferably flag remains set until the refresh is complete, or the cartridge has been mounted before a refresh is performed, or the cartridge is exported or otherwise no longer available for refresh. Additionally, a mechanism may be provided to allow users to exclude or include individual cartridges from the auto-refresh process.

When a cartridge is marked for refresh and the "refresh required" flag is set, the library determines which drives are currently available to perform the refresh. Any unmounted drives are potentially eligible for refresh operations; however, a mechanism may be provided to include, exclude, or limit the number of drives eligible for auto-refresh to prevent overall system performance impacts. Also, any fenced or poor quality drives may be excluded from the target drive pool. This can be done by checking the Refresh Eligibility status of the drive.

When a target drive is available and eligible, the library mounts the target cartridge to the available drive (managed like any other library mount) and issues a refresh/verify command; the volume is marked unavailable for the period it is mounted and the drive will busy/queue host commands just as if a cleaning operation is in progress.

The drive performs the refresh and/or verify operation. In general, this operation may be the first step of a multi-step verification or the entire process if a refresh operation. The duration of this step is preferably limited, e.g., held to 5 minutes or less, to prevent non-predictive drive/cartridge access contention. The drive automatically unloads the cartridge as soon as the operation is complete.

When the drive completes the operation, a status is returned to the library. The status contains a Step Complete and Sequence complete codes. The Step Complete code is a field that indicates the success or failure of the command step. This indicates if the physical operation was completed successfully. The Sequence Complete code is a field that indicates if the entire operation is complete, or additional mounts are required for a multi-step operation.

The library dismounts the tape and updates status fields and evaluates the returned status. If the returned status for media quality includes a quality metric, or derivative thereof, that is yellow or red, e.g., beyond a satisfactory threshold or failing, the tape may be scheduled for a second drive verify. If the second drive verify fails, a Tape Alert or MIM status message for the volume may be generated or other error reporting action taken.

Error Cases

In general, any drive error may result in termination of the verification operation and immediate unload. Further, a bad status report may be sent back to the library on the Completion Code along with null values for media quality.

Drive Errors

If tape is stuck in the drive, the library can reset the drive via serial command and recover the cartridge. If not, an error status may be returned, e.g., just as if a cleaner had gotten stuck in the drive. Also, the library may mark the cartridge as unavailable and generate an error alert of some type to notify the user.

If the drive cannot come ready, the verification operation may terminate and the tape is unloaded. If a power down or reset occurs during the verification operation, Graceful Dynamic Braking (GDB) and mid-tape recovery may unload the cartridge. Library logic can potentially determine this and recover. Library interface failures may be treated as test termination and the tape unloaded.

In general, unrecoverable drive errors may be treated as they would if they occurred during a clean operation.

Media Errors

Completion code failures may be scheduled for second drive verify. Yellow/red quality results may be scheduled for second drive verify. Media quality may be directly presented on the web interface. Error alerts or SMI-S messages can be generated (if there is someone or something to receive them) for double failures.

The library may also automatically perform a copy of the problem tape to another tape.

It should be noted that, the invention can take the form of an embodiment containing both hardware and software elements. In one embodiment, the invention may be implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving an instruction to perform a verification operation on a media cartridge having a tape wrapped around a spool;
unwrapping at least some of the tape from the spool of the media cartridge;
after the unwrapping, wrapping at least some of the tape back onto the spool;
during at least one of the unwrapping and wrapping, performing a verification operation;
applying a time limit, wherein the verification operation is terminated if the time limit is reached;
generating a quality metric based on the verification operation, wherein the quality metric is indicative of a quality of the media cartridge; and
outputting the quality metric or derivative thereof,
wherein the quality metric is generated based at least in part on a number of error events found during at least one of a servo verify and a data verify, wherein the quality metric or derivative thereof is a value in a range having at least three values, wherein at least some data on the tape is overwritten with new data while the media cartridge is mounted in a drive, and the verification operation is performed using the new data.

2. A method as recited in claim 1, wherein the verification operation includes reading outer servo tracks on the tape.

3. A method as recited in claim 2, wherein generating the quality metric includes consideration of at least one of a number of stopwrite events, a number of servo pattern error events, and a number of linear position error events.

4. A method as recited in claim 1, wherein the verification includes reading data tracks on the tape.

5. A method as recited in claim 4, wherein all data tracks on the tape are read.

6. A method as recited in claim 4, wherein error recovery procedures are performed during the verification.

7. A method as recited in claim 4, wherein generating the quality metric includes consideration of at least one of a number of read perms, a number of read temps, and a number of reading errors.

8. A method as recited in claim 1, wherein the tape is unwrapped from the spool of the media cartridge to about an end of the tape.

9. A method as recited in claim 1, further comprising determining an eligibility of a drive to perform the wrapping and unwrapping and at least assist in the verification operation.

10. A method as recited in claim 1, wherein the quality metric or derivative thereof is stored on the media cartridge.

11. A method as recited in claim 1, wherein a simple refresh operation is performed after performing the verification operation, the simple refresh operation comprising unwrapping the tape from the spool of the media cartridge to about an end of the tape without performing the verification operation, and after the unwrapping, wrapping the tape back onto the spool without performing the verification operation.

12. A method, comprising:
receiving an instruction to perform a verification operation on a media cartridge having a tape wrapped around a spool;
unwrapping at least some of the tape from the spool of the media cartridge;
after the unwrapping, wrapping at least some of the tape back onto the spool;
during at least one of the unwrapping and wrapping, performing a verification operation;

applying a time limit, wherein the verification operation is terminated if the time limit is reached;

generating a quality metric based on the verification operation;

outputting the quality metric or derivative thereof; and overwriting at least some data on the tape with new data, and performing the verification operation using at least the new data.

13. A method, comprising:

performing a verification operation on a media cartridge having a tape wrapped around a spool, the verification operation including at least one of a servo verify and a data verify;

generating a quality metric based on the verification operation, wherein the quality metric is generated based at least in part on a number of error events found during the at least one of the servo verify and the data verify, the quality metric being different than the number of error events; and outputting the quality metric or derivative thereof to a user, the quality metric being indicative of a quality of the media cartridge, wherein the quality metric or derivative thereof is a value in a range having at least three values.

14. A method as recited in claim 13, wherein the verification operation includes the servo verify, wherein generating the quality metric includes consideration of at least one of a number of stopwrite events, a number of servo pattern error events, and a number of linear position error events.

15. A method as recited in claim 13, wherein the verification includes the data verify, wherein generating the quality metric includes consideration of at least one of a number of read perms, a number of read temps, and a number of reading errors.

16. A method as recited in claim 13, wherein at least some data on the tape is overwritten with new data while the media cartridge is mounted in the drive, and the verification operation is performed using the new data.

17. A system, comprising:

a processor operable to:

decide to perform a refresh operation on a media cartridge having a tape wrapped around a spool;

determine which drive of a plurality of drives is available to perform the refresh operation;

cause the media cartridge to be mounted to the available drive;

cause the drive to unwrap the tape from the spool of the media cartridge to about an end of the tape; and cause the drive to wrap the tape back onto the spool after the unwrapping, wherein at least some data on the tape is overwritten with new data, and a verification operation is performed using the new data.

* * * * *